US 6,892,229 B1

(12) United States Patent
Karadogan et al.

(10) Patent No.: US 6,892,229 B1
(45) Date of Patent: May 10, 2005

(54) SYSTEM AND METHOD FOR ASSIGNING DYNAMIC HOST CONFIGURATION PROTOCOL PARAMETERS IN DEVICES USING RESIDENT NETWORK INTERFACES

(75) Inventors: Baris Karadogan, Chicago, IL (US); Ronald Lee, Northbrook, IL (US)

(73) Assignee: 3Com Corporation, Marlborough, MA (US)

(*) Notice: Subject to any disclaimer, the term of this patent is extended or adjusted under 35 U.S.C. 154(b) by 0 days.

(21) Appl. No.: 09/163,817

(22) Filed: Sep. 30, 1998

(51) Int. Cl.[7] ............................................. G06F 15/16
(52) U.S. Cl. ..................... 709/220; 709/245; 709/226
(58) Field of Search .............................. 709/245, 220, 709/225, 222, 226; 713/201

(56) References Cited

U.S. PATENT DOCUMENTS

| | | | |
|---|---|---|---|
| 4,996,685 A | 2/1991 | Farese et al. ............... | 370/58.1 |
| 5,014,234 A | 5/1991 | Edwards, Jr. ............... | 364/900 |
| 5,138,712 A | 8/1992 | Corbin ....................... | 395/700 |
| 5,301,273 A | 4/1994 | Konishi ...................... | 395/200 |
| 5,347,304 A | 9/1994 | Moura et al. | |
| 5,430,727 A | 7/1995 | Callon ..................... | 370/85.13 |
| 5,442,749 A | 8/1995 | Northcutt et al. ...... | 395/200.09 |
| 5,488,412 A | 1/1996 | Majeti et al. | |
| 5,489,897 A | 2/1996 | Inoue ..................... | 340/870.39 |
| 5,528,595 A | 6/1996 | Walsh et al. .............. | 370/85.13 |
| 5,583,931 A | 12/1996 | Schneider et al. | |
| 5,586,121 A | 12/1996 | Moura et al. | |
| 5,600,717 A | 2/1997 | Schneider et al. | |
| 5,606,606 A | 2/1997 | Schneider et al. | |

(Continued)

FOREIGN PATENT DOCUMENTS

| | | |
|---|---|---|
| WO | WO 00/67385 | 11/2000 |

OTHER PUBLICATIONS

Patrick H. Fry et al., A Caching DHCP Relay Agent, Rensselaer Polytechnic Institute, Department of Computer Science, Technical Report 97–10, 1997, pp. 1–13.*

S. Adiraju, J. Fijolek, Memorandum "IPCDN Telephony Return MIB" Mar. 23, 1998.

R. Droms, "Dynamic Host Configuration Protocol" Mar. 1997.

Data–Over–Cable Interface Specification, "Security System Specification" May 6, 1997.

Data–Over–Cable Service Interface Specifications, "Operations Support System Interface Specification" Apr. 3, 1997.

Data–Over–Cable Service Interface Specifications, "Baseline Provacy Interface Specification" Sep. 22, 1997.

Data–Over–Cable Service Interface Specifications, "Removable Security Module Interface Specification" Feb. 8, 1998.

(Continued)

*Primary Examiner*—Patrice Winder
(74) *Attorney, Agent, or Firm*—McDonnell Boehnen Hulbert & Berghoff LLP

(57) ABSTRACT

A system and method for obtaining configuration parameters from a dynamic host configuration protocol (DHCP) server in a network device that uses an off-the-shelf operating system. The operating system has a resident client that obtains a set of configuration parameters and assigns the parameters without providing options for obtaining additional parameters. A DHCP client is provided for obtaining a desired set of configuration parameters. The DHCP client retrieves the parameters from an offer made by the DHCP server and sends the parameters to a DHCP server simulator. The DHCP client invokes the resident DHCP client to retrieve a set of configuration parameters. The DHCP server simulator intercepts the request to the server before the request is sent on the network. The DHCP server simulator simulates an offer of the configuration parameters obtained in the request by the DHCP client.

10 Claims, 4 Drawing Sheets

U.S. PATENT DOCUMENTS

| | | |
|---|---|---|
| 5,608,446 A | 3/1997 | Carr et al. |
| 5,610,910 A | 3/1997 | Focsaneanu et al. ........ 370/351 |
| 5,623,542 A | 4/1997 | Schneider et al. |
| 5,623,601 A | 4/1997 | Vu ........................ 395/187.01 |
| 5,636,211 A | 6/1997 | Newlin et al. |
| 5,675,732 A | 10/1997 | Majeti et al. |
| 5,675,742 A | 10/1997 | Jain et al. .................... 395/200 |
| 5,678,041 A | 10/1997 | Baker et al. ................ 395/609 |
| 5,708,654 A | 1/1998 | Arndt et al. ................ 370/242 |
| 5,710,885 A | 1/1998 | Bondi ........................ 709/224 |
| 5,724,510 A | 3/1998 | Arndt et al. ............. 395/200.5 |
| 5,761,602 A | 6/1998 | Wagner et al. ............... 455/3.1 |
| 5,778,181 A | 7/1998 | Hidary et al. .......... 395/200.48 |
| 5,784,597 A | 7/1998 | Chiu et al. .................. 395/552 |
| 5,790,198 A | 8/1998 | Roop et al. ................. 348/460 |
| 5,790,548 A | 8/1998 | Sistanizadeh et al. ....... 370/401 |
| 5,790,677 A | 8/1998 | Fox et al. ..................... 380/24 |
| 5,790,770 A | 8/1998 | McClure et al. ....... 395/200.61 |
| 5,793,747 A | 8/1998 | Kline ......................... 370/230 |
| 5,799,086 A | 8/1998 | Sudia .......................... 380/23 |
| 5,805,804 A | 9/1998 | Laursen et al. ................. 348/7 |
| 5,812,819 A | 9/1998 | Rodwin et al. ............. 395/500 |
| 5,815,664 A | 9/1998 | Asano .................. 395/200.57 |
| 5,818,845 A | 10/1998 | Moura et al. ............... 370/449 |
| 5,819,042 A | 10/1998 | Hansen ....................... 714/756 |
| 5,828,655 A | 10/1998 | Moura et al. ............... 370/326 |
| 5,828,666 A | 10/1998 | Focsaneanu et al. ........ 370/389 |
| 5,835,727 A | 11/1998 | Wong et al. ........... 395/200.68 |
| 5,848,233 A | 12/1998 | Radia et al. ............ 395/187.01 |
| 5,854,901 A | 12/1998 | Cole et al. .................. 709/245 |
| 5,859,852 A | 1/1999 | Moura et al. ............... 370/449 |
| 5,864,679 A | 1/1999 | Kanai et al. ................ 709/238 |
| 5,870,134 A | 2/1999 | Laubach et al. .............. 348/12 |
| 5,872,523 A | 2/1999 | Dellaverson et al. .. 340/825.52 |
| 5,884,024 A | 3/1999 | Lim et al. .............. 395/187.01 |
| 5,892,754 A | 4/1999 | Kompella et al. .......... 370/236 |
| 5,894,479 A | 4/1999 | Mohammed ................ 370/401 |
| 5,909,549 A | 6/1999 | Compliment et al. ....... 709/223 |
| 5,915,119 A | 6/1999 | Cone .................... 395/750.02 |
| 5,922,049 A | 7/1999 | Radia et al. ................ 709/220 |
| 5,923,659 A | 7/1999 | Curry et al. ................ 370/401 |
| 5,926,458 A | 7/1999 | Yin ............................. 370/230 |
| 5,929,850 A | 7/1999 | Broadwin et al. .......... 345/327 |
| 5,941,988 A | 8/1999 | Bhagwat et al. ............ 713/201 |
| 5,958,007 A | 9/1999 | Lee et al. .................... 709/219 |
| 5,960,177 A | 9/1999 | Tanno .................. 395/200.59 |
| 5,974,453 A | 10/1999 | Andersen et al. ........... 709/220 |
| 5,982,748 A | 11/1999 | Yin et al. .................... 370/232 |
| 5,987,524 A | 11/1999 | Yoshida et al. ............. 709/245 |
| 5,991,292 A | 11/1999 | Focsaneanu et al. ........ 370/352 |
| 5,991,306 A | 11/1999 | Burns et al. ................ 370/429 |
| 5,996,076 A | 11/1999 | Rowney et al. ............. 713/201 |
| 5,999,536 A | 12/1999 | Kawafuji et al. ........... 370/401 |
| 6,009,103 A | 12/1999 | Woundy ..................... 370/401 |
| 6,012,088 A | 1/2000 | Li et al. ...................... 709/219 |
| 6,013,107 A | 1/2000 | Blackshear et al. ......... 703/229 |
| 6,018,767 A | 1/2000 | Fijolek et al. .............. 709/218 |
| 6,031,841 A | 2/2000 | Woundy ..................... 370/410 |
| 6,032,019 A | 2/2000 | Chen et al. .................. 455/5.1 |
| 6,046,979 A | 4/2000 | Bauman ...................... 370/229 |
| 6,049,825 A | 4/2000 | Yamamoto .................. 709/221 |
| 6,049,826 A | 4/2000 | Beser ......................... 709/222 |
| 6,058,421 A | 5/2000 | Fijolek et al. .............. 709/225 |
| 6,061,349 A | 5/2000 | Coile et al. ................. 370/389 |
| 6,064,372 A | 5/2000 | Kahkoska ................... 345/173 |
| 6,070,187 A | 5/2000 | Subramaniam et al. ..... 709/220 |
| 6,070,242 A | 5/2000 | Wong et al. ................ 713/201 |
| 6,070,246 A | 5/2000 | Beser ......................... 713/201 |
| 6,073,178 A | 6/2000 | Wong et al. ................ 709/229 |
| 6,104,700 A | 8/2000 | Haddock et al. ............ 370/235 |
| 6,112,258 A | 8/2000 | Miller et al. .................. 710/19 |
| 6,122,254 A | 9/2000 | Aydemir et al. ............ 370/235 |
| 6,128,298 A | 10/2000 | Wootton et al. ............ 370/392 |
| 6,130,879 A | 10/2000 | Liu ............................. 370/230 |
| 6,137,792 A | 10/2000 | Jonas et al. ................. 370/354 |
| 6,137,793 A | 10/2000 | Gorman et al. ............. 370/360 |
| 6,148,410 A | 11/2000 | Baskey et al. ................. 714/4 |
| 6,178,455 B1 | 1/2001 | Schutte et al. .............. 709/228 |
| 6,182,141 B1 * | 1/2001 | Blum et al. ................. 709/227 |
| 6,185,624 B1 | 2/2001 | Fijolek et al. .............. 709/239 |
| 6,189,102 B1 | 2/2001 | Beser ......................... 713/201 |
| 6,208,656 B1 | 3/2001 | Hrastar et al. .............. 370/401 |
| 6,212,563 B1 | 4/2001 | Beser ......................... 709/227 |
| 6,216,171 B1 | 4/2001 | Isono et al. ................. 709/250 |
| 6,223,222 B1 | 4/2001 | Fijolek et al. .............. 709/227 |
| 6,240,464 B1 | 5/2001 | Fijolek et al. .............. 709/250 |
| 6,243,369 B1 | 6/2001 | Grimwood et al. ......... 370/335 |
| 6,260,072 B1 | 7/2001 | Rodriguez-Moral ........ 709/241 |
| 6,269,099 B1 | 7/2001 | Borella et al. .............. 370/389 |
| 6,272,150 B1 | 8/2001 | Hrastar ....................... 370/486 |
| 6,275,853 B1 | 8/2001 | Beser et al. ................. 709/223 |
| 6,289,377 B1 | 9/2001 | Lalwaney et al. .......... 709/222 |
| 6,295,554 B1 | 9/2001 | Karadogan .................. 709/219 |
| 6,301,223 B1 | 10/2001 | Hrastar et al. .............. 370/227 |
| 6,301,618 B1 | 10/2001 | Sitaraman et al. .......... 709/227 |
| 6,308,328 B1 | 10/2001 | Bowcutt et al. ............. 725/111 |
| 6,331,987 B1 | 12/2001 | Beser ......................... 370/486 |
| 6,332,163 B1 | 12/2001 | Bowman-Amuah ......... 709/231 |
| 6,337,858 B1 | 1/2002 | Petty et al. ................. 370/356 |
| 6,351,773 B1 | 2/2002 | Fijolek et al. .............. 709/228 |
| 6,370,147 B1 | 4/2002 | Beser ......................... 370/401 |
| 6,393,478 B1 | 5/2002 | Bahlmann ................... 709/224 |
| 6,442,158 B1 | 8/2002 | Beser ......................... 370/352 |
| 6,449,291 B1 | 9/2002 | Burns et al. ................ 370/516 |
| 6,453,472 B1 | 9/2002 | Leano et al. ................ 725/111 |
| 6,490,727 B1 | 12/2002 | Nazarathy et al. .......... 725/129 |
| 6,510,162 B1 | 1/2003 | Fijolek et al. .............. 370/432 |
| 2002/0122050 A1 | 9/2002 | Sandberg .................... 345/705 |
| 2002/0136165 A1 | 9/2002 | Ady et al. ................... 370/241 |
| 2003/0028891 A1 | 2/2003 | Hardt et al. ................ 725/107 |

OTHER PUBLICATIONS

Data–Over–Cable Service Interface Specifications,"Cable Modem Termination System—Network Side Interface Specification" Jul. 2, 1996.

Data–Over–Cable Service Interface Specifications, "Operations Support System Interface Specification Baseline privacy Interface MIB" Mar. 31, 1998.

Data–Over–Cable Service Interface Specifications, "Cable Modem to Customer Premise Equipment Interface Specification" Mar. 17, 1998.

Data–Over–Cable Service Interface Specifications, "Radio Frequency Interface Specification" Oct. 8, 1997.

Data–Over Cable Service Interface Specifications, "Cable Modem Telephony Return Interface Specification" Aug. 4, 1997.

"Radio Frequency Interface Specification (Interim Specification) SP–RFI–I04–980724", MCNS Holdings, L.P., 1997, pp. ii to 196.

Droms, R., *Dynamic Host Configuration Protocol*, Request for Comments 1541, Oct. 1993, pp. 1 to 31.

RFC 791, *Internet Protocol, DARPA Internet Program Protocol Specification*, Sep. 1981, pp. 1–37.

Postel, J., *Internet Protocol, DARPA Internet Program Protocol Specification*, RFC 792, Sep. 1981, pp. 1–14.

Postel, J., *User Datagram Protocol*, RFC 768, Aug. 28, 1980, pp. 1–3.

RFC 793, *Transmission Control Protocol, DARPA Internet Program Protocol Specification*, Sep. 1981, pp. 1–51.

Case, J. et al., *A Simple Network Management Protocol (SNMP)*, RFC 1157, May 1990, pp. 1–26.

Sollins, K., *The TFTP Protocol (Revision 2)*, RFC 1350, Jul. 1992, pp. 1–9.

Alexander, S., *DHCP Options and BOOTP Vendor Extensions*, RFC 2132, Mar. 1997, pp. 1–37.

"Radio Frequency Interface Specification (Interim Specification) SP–RFIv1.1–I03–991105", MCNS Holdings, L.P., 1999, pp. Ii to 366.

"Radio Frequency Interface Specification (Interim Specification) SP–RFI–I05–991105", MCNS Holdings, L.P., 1999, pp. ii to 202.

"Radio Frequency Interface Specification (Interim Spoecification) SP–RFIv1.1–I06–001215", MCNS Holdings, L.P., 2000, pp. ii to 432.

* cited by examiner

SYSTEM AND METHOD FOR ASSIGNING DYNAMIC HOST CONFIGURATION PROTOCOL PARAMETERS IN DEVICES USING RESIDENT NETWORK INTERFACES

BACKGROUND OF THE INVENTION

A portion of the disclosure of this patent document contains material, which is subject to copyright protection. The copyright owner has no objection to the facsimile reproduction by anyone of the patent disclosure, as it appears in the Patent and Trademark Office patent files or records, but otherwise reserves all copyright rights whatsoever.

A. Field of the Invention

The present invention relates to the field of network communications and, more particularly, with configuring network devices having standard interfaces.

B. Description of Related Art

The Dynamic Host Configuration Protocol (DHCP) is used by devices that are connected to networks, such as the Internet, to obtain parameters and make it possible for the devices to communicate on the Internet. The devices perform the DHCP protocol by querying a DHCP server during the initialization procedure performed by the device at boot up. Once the DHCP server responds with the appropriate parameters, the devices may begin to communicate by sending and receiving packets on the Internet.

The parameters that a device may obtain using the DHCP include an Internet Protocol address (IP address), a list of domain name servers, a domain name, the lease time of the IP address, a default gateway for the device, a trivial file transfer protocol (TFTP) server address and TFTP file name. The DHCP has been adopted by the industry as a standard protocol that is documented in RFC 2131. The RFC 2131 describes the many parameters that may be obtained from the DHCP server. The RFC 2131 also describes instructions for communicating with the DHCP server.

The devices that communicate over the Internet typically use standard off-the-shelf operating systems such as Windows 95, Windows NT, Unix, etc. These operating systems may include a complete network communications architecture that simplifies the connection between a communications application and the drivers that the application uses to communicate with the network. For example, the Windows operating system from Microsoft includes a standard interface for network interface cards (NIC). The standard interface includes hardware drivers and any protocol drivers that may be used by the application to communicate with other applications over the Internet.

COMPUTER PROGRAM LISTING APPENDIX

The application contains a computer program listing appendix on a computer disc, which is fully incorporated by reference, in compliance with 37 CFR §1.52(e). The compact disc contains a single file named "Appendix.pdf" of size 392,243 bytes created in 1998.

The standard interface used in the Windows operating system also includes a software component called a DHCP client, which is used by Windows to obtain configuration parameters from the DHCP server for selected network interface cards. Like other software components that are provided by the Windows operating system, the DHCP client operates as a block box. The DHCP client may be invoked, however, the user has no choice over the parameters that may be obtained from the DHCP server.

Devices that communicate over the Internet may need to obtain parameters from the DHCP server that the Windows DHCP client may not provide. For example, cable modems are network interface devices that may be installed in a personal computer to provide Internet communication via a high frequency coaxial cable network (HFC). Such a system is called a Data Over Cable System. Data Over Cable Systems use a device called a cable modem termination system as an intermediary between a number of cable modems connected over the HFC communications medium and a data network such as the Internet. The cable modem termination system also provides facilities that may be used by a system manager to manage the resources available to the cable modems. One such facility may include a way of modifying the characteristics of either a single cable modem or a group of cable modems by manipulating the DHCP configuration parameters. Such a facility may require that the device that uses the cable modem be able to request configuration parameters that may not be provided by using the DHCP client.

One solution for obtaining specific configuration parameters may be to design and develop a separate DHCP client. However, the DHCP client communicates the parameters, or assigns the parameters, to various components of the standard protocol drivers that are included in the Windows operating system. The Windows operating system provides no way to alter the manner in which these parameters are assigned. The Windows operating system also provides no way to determine how the parameters are assigned. In order to use a non-Windows DHCP client, the remaining components in the Windows protocol stack would also have to be designed and developed. However, this would eliminate one of the advantages of using an off-the-shelf operating system such as Windows. The development of such software is expensive and time consuming. Moreover, no third party DHCP clients or network stacks that operate with Windows are available. Finally, other operating systems may have the same problem with their network interface resources. It would be desirable to obtain specific configuration parameters from a DHCP server for a network device that uses the standard resources provided by off-the-shelf operating systems. It would be desirable to obtain such parameters in systems that Windows and other operating systems that may hide the assignment of the parameters.

SUMMARY OF THE INVENTION

In view of the above, a method is provided for obtaining configuration parameters for a network device in a network connected to a dynamic host configuration server (DHCP server). A device dynamic host configuration protocol client (DHCP client) is invoked to discover the DHCP server. An offer message is received from the DHCP server. A request message is sent to request a plurality of selected configuration parameters from the DHCP server. The DHCP server sends the selected configuration parameters to the device DHCP client. The selected configuration parameters are passed to a DHCP server simulator. The DHCP server simulator senses a discover message from a resident DHCP client. The DHCP server simulator sends an offer message to the resident DHCP client. The DHCP server simulator sends the selected configuration parameters. The selected configuration parameters to permit communication by the device driver over the network are assigned.

In a further aspect of the present invention, an improvement is made in a network connected to a network device and a dynamic host configuration protocol server (DHCP server). The network device has a resident dynamic host configuration protocol client (DHCP client), and a device driver. The resident DHCP client is operable to query the DHCP server. The improvement comprises a DHCP server simulator and a device DHCP client. The device DHCP client is operable to query the DHCP server for a selected set of configuration parameters. The device DHCP client passes the selected configuration parameters to the resident DHCP client and invokes the resident DHCP client. The DHCP server simulator monitors the resident DHCP client and sends to the resident DHCP client a plurality of DHCP messages comprising the selected configuration parameters.

BRIEF DESCRIPTION OF THE DRAWINGS

Presently preferred embodiments of the invention are described below in conjunction with the appended drawing figures, wherein like reference numerals refer to like elements in the various figures, and wherein.

DETAILED DESCRIPTION OF THE PREFERRED EMBODIMENT

The description that follows fully incorporates by reference the following co-pending patent applications: "METHOD AND SYSTEM FOR SECURE CABLE MODEM INITIALIZATION", U.S. patent Ser. No. 09/018,756 to Nurettin B. Beser (filed Feb. 4, 1998 and assigned to the assignee of the present invention); "METHOD AND SYSTEM FOR SECURE CABLE MODEM REGISTRATION", U.S. patent Ser. No. 09/018,372 to Nurettin B. Beser (filed May 14, 1998 and assigned to the assignee of the present invention); and "METHOD AND SYSTEM FOR CABLE MODEM INITIALIZATION USING DYNAMIC SERVERS", U.S. patent Ser. No. 09/018,400 to Nurettin B. Beser (filed May 14, 1998).

Figure 1:
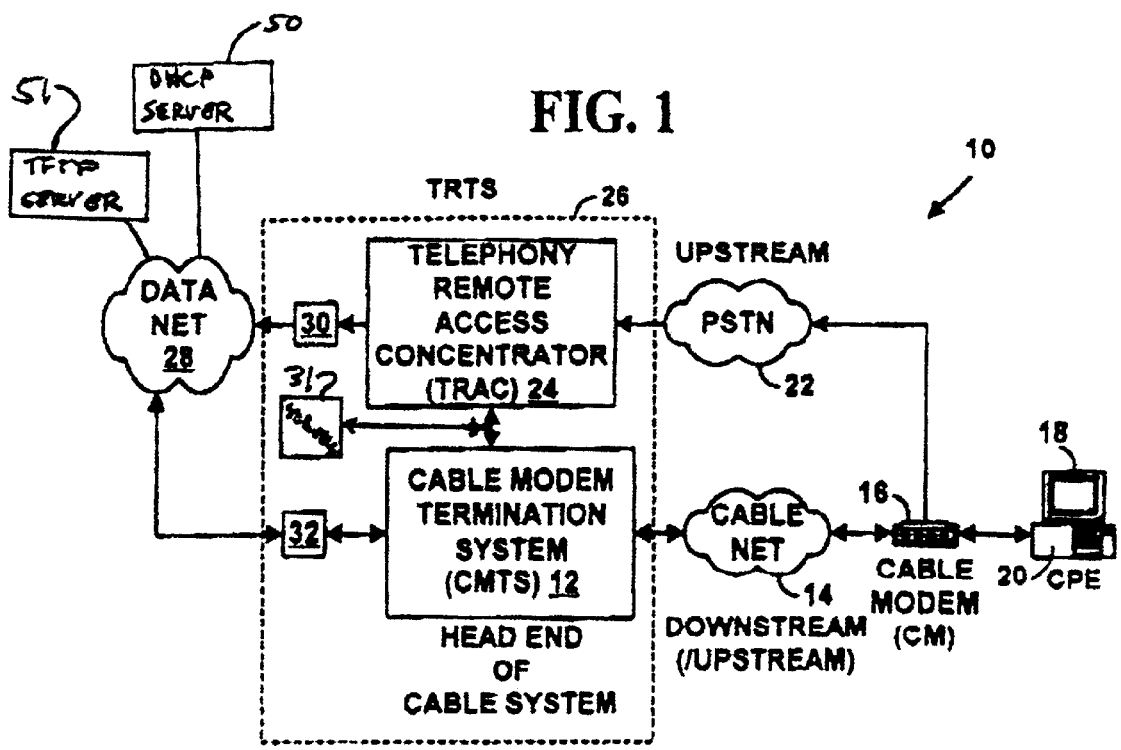
FIG. 1 is a block diagram of a network of the type in which the present invention finds particular use.

FIG. 1 is a block diagram showing a data over cable network 10. It is to be understood by one of skill in the art that the data over cable network 10 is described as an example. Any type of network may be used in the present invention.

Most cable providers known in the art predominately provide uni-directional cable systems, supporting only a "downstream" data path. A downstream data path is the flow of data from a cable television network "headend" to customer premise equipment (e.g., a customer's personal computer). A cable television network headend is a central location that is responsible for sending cable signals in a downstream direction. A return path via a telephony network ("telephony return") is typically used for an "upstream" data path in unidirectional cable systems. An upstream data path is the flow of data from customer premise equipment back to the cable television network headend.

However, data-over-cable system 10 may also provide a bi-directional data path (i.e., both downstream and upstream) without telephony return as is also illustrated in FIG. 1. In a data-over cable system without telephony return, customer premise equipment or cable modem has an upstream connection to the cable modem termination system via a cable television connection, a wireless connection, a satellite connection, or a connection via other technologies to send data upstream to the cable modem termination system.

The data over cable network 10 provides network access for a customer premises equipment (CPE) 18 via a cable modem network (CM) 14. The cable modem network 14 is connected to a data network 28 (e.g., the Internet, an intranet, or any network that uses the transport control protocol/Internet protocol (TCP/IP)) by a cable modem termination system 12. The CPEs 18 may include DHCP clients for retrieving configuration parameters from a DHCP server 50. The CPE 18 may also retrieve configuration files from a trivial file transfer protocol server 51. For information regarding the use of the DHCP server 50 and the TFTP server 51 to retrieve configuration information during the initialization of the cable modem system, reference is made to U.S. patent application Ser. No. 09/018,756 to Beser.

The CPE 18 in the network 10 of FIG. 1, uses the Windows NT, Windows 95 or later versions of Windows as an operating system. It is to be understood that any operating system having architecture for interfacing to communication devices may be used in the CPE 18. Such architecture advantageously standardizes communications interfaces and reduces the development time of application that uses communications interfaces.

The CPE 18 includes a cable modem-CPE interface (CMCI) 20 and a cable modem (CM) 16. The cable modem-CPE interface 20 includes the Windows Network Architecture and any drivers for controlling the hardware interface of the cable modem 16. The cable modem 16 is connected to the cable modem network 14 which may include cable television networks such as those provided by Comcast Cable Communications Inc. of Philadelphia, Pa., Cox Communications, of Atlanta, Ga., Tele-Communications, Inc. of Englewood, Colo., Time-Warner Cable, of Marietta, Ga., Continental Cable Vision, Inc. of Boston, Mass. and others.

The cable modem 16 is connected to a Public Switched Telephone Network ("PSTN") 22 with an upstream telephony connection. The PSTN 22 includes those public switched telephone networks provided by AT&T, Regional Bell Operating Companies (e.g., Ameritch, U.S. West, Bell Atlantic, Southern Bell Communications, Bell South, NYNEX, and Pacific Telesis Group), GTE, and others. The upstream telephony connection is any of a standard telephone line connection, Integrated Services Digital Network ("ISDN") connection, Asymmetric Digital Subscriber Line ("ADSL") connection, or other telephony connection. The PSTN 22 is connected to a Telephony Remote Access Concentrator ("TRAC") 24.

In a data-over cable system without telephony return, the cable modem 16 has an upstream connection to CMTS 12 via a cable television connection, a wireless connection, a satellite connection, or a connection via other technologies to send data upstream outside of the telephony return path. An upstream cable television connection via cable network 14 is illustrated in FIG. 1.

The cable modem 16 includes cable modems provided by the 3Com Corporation of Santa Clara, Calif., U.S. Robotics Corporation of Skokie, Ill., and others. The cable modem 16 may also include functionality to connect only to the cable network 14 and receives downstream signals from cable network 14 and sends upstream signals to cable network 14 without telephony return. The present invention is not limited to cable modems used with telephony return.

The CMTS 12 and TRAC 24 may be at a "headend" of the cable system 10, or TRAC 24 may be located elsewhere and have routing associations to CMTS 12. The CMTS 12 and TRAC 24 together are called a "Telephony Return Termination System" ("TRTS") 26. The TRTS 26 is illustrated by a dashed box in FIG. 1. The CMTS 12 and TRAC 24 make up TRTS 26 whether or not they are located at the headend of cable network 14, and TRAC 24 may in located in a different geographic location from CMTS 12. Content severs, operations servers, administrative servers and maintenance servers, shown as servers 31, may be used in data-over-cable system 10. The servers 31 may be in various locations.

Access points to data-over-cable system 10 are connected to one or more CMTS's 12 or cable headend access points. Such configurations may be "one-to-one", "one-to-many" or "many-to-many," and may be interconnected to other Local Area Networks ("LANs") or Wide Area Networks ("WANs").

The TRAC 24 is connected to the data network 28 by a TRAC-Network System Interface 30 ("TRAC-NSI"). The CMTS 12 is connected to data network 28 by a CMTS-Network System Interface ("CMTS-NSI") 32. The present invention is not limited to data-over-cable system 10 illustrated in FIG. 1, and more or fewer components, connections and interfaces could also be used. In addition, the present invention may include any type of network that uses the DHCP server for configuration parameters and that runs using any operating system.

The DHCP server 50 and the TFTP server 51 may operate on any computer that is accessible to the cable modem 16 over the data network 28. Alternatively, the DHCP server 50 may be accessible over a local area network. The DHCP server 50 and the TFTP server 51 will provide configuration services for any DHCP client that may connect to it over the data network 28. For example, in the cable system 10 shown in FIG. 1, the DHCP server 50 may provide configuration services for the cable modem 16, any other cable modem connected to the cable network 14 and/or any network device connected to the data network 28.

The advantage of the system 10 shown in FIG. 1 is that the CPE 18 may use the resources provided by the Windows development tools without limiting the configuration parameters available from the DHCP server 50. For example, the Windows system includes a DHCP client (described below) that does not retrieve a TFTP server name and file name. The TFTP server is used in the system 10 to obtain a configuration file for each cable modem. The system 10 in FIG. 1 advantageously retrieves the TFTP server name and configuration file name as well as other DHCP parameters that are not retrieved by the DHCP client in the Windows Network Architecture.

Figure 2:
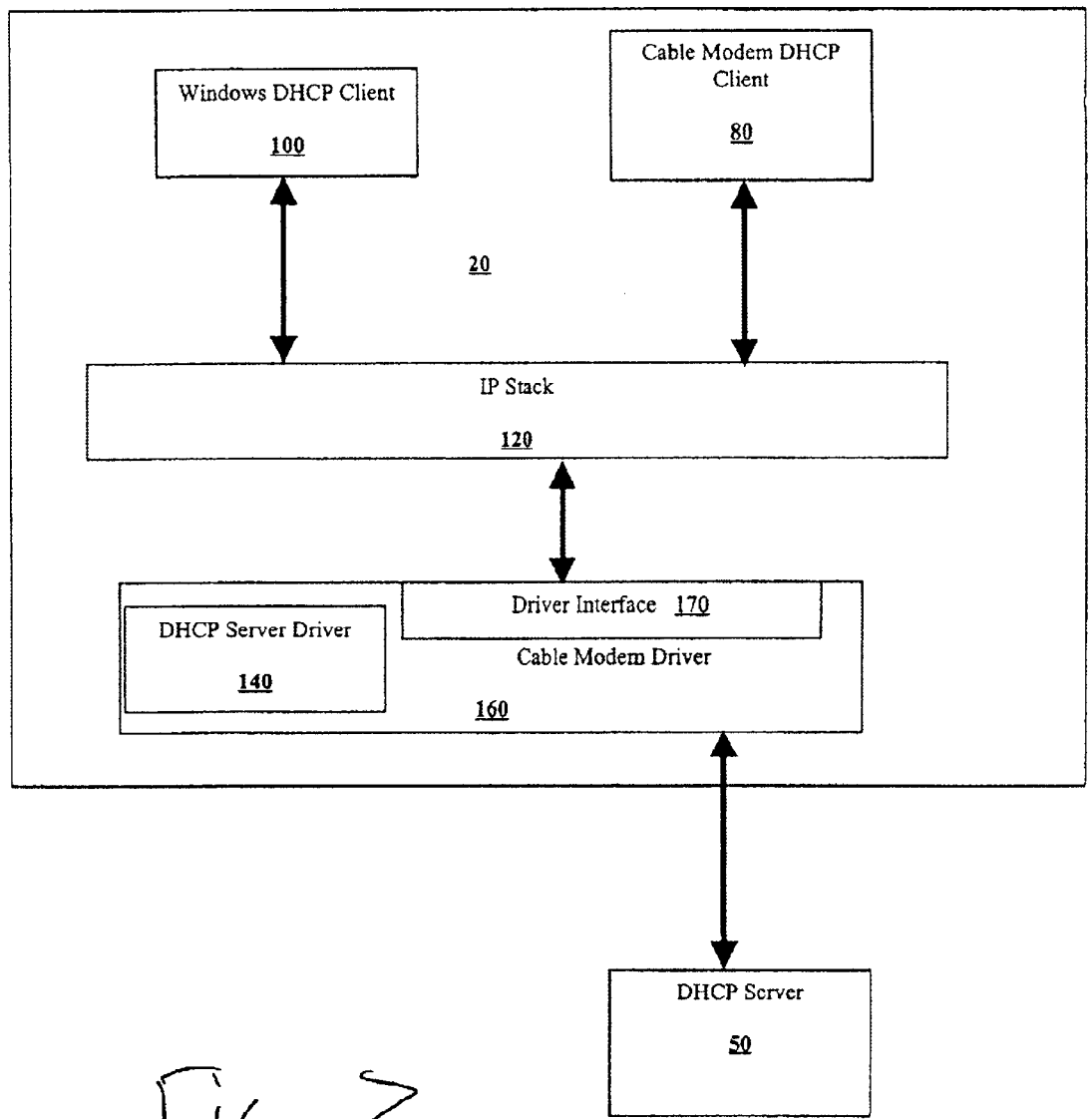
FIG. 2 is a block diagram of a network device that uses a standard operating system having resident network interface for communicating over the network shown in FIG. 1.

FIG. 2 is a block diagram of the CPE 18 showing the CPE to cable modem interface 20 according to a preferred embodiment of present invention. The CPE cable modem interface 20 includes a cable modem DHCP client 80, a resident DHCP client such as the Windows DHCP client 100, an Internet protocol (IP) stack 120, and a cable modem driver 160. The cable modem driver 160 communicates over the cable network 14 (shown in FIG. 1) to other devices on the Internet, such as the DHCP server 30. The cable modem driver 160 includes a driver interface 170 and a DHCP server simulator 140.

The Windows DHCP client 100 and the IP stack 120 are Windows software components that come bundled with the Microsoft Windows operating system. In addition, the cable modem driver 160 may be developed using the Network Driver Interface Specification (NDIS) in the Windows Network Architecture. The interface that is used to call the resources of the cable modem driver 160 are in the driver interface 170. The driver interface 170 may also be used to access the resources of the DHCP server simulator 140.

The Windows Network Architecture also includes libraries of function calls to protocol drivers which are programs for executing the protocol performed by the IP stack 120. The protocol drivers may be accessed using the Transport Driver Interface (TDI) which is also known as a Windows socket. Information regarding the Windows Network Architecture or any other Windows programming resource may be found in the Microsoft Windows 95 Resource Kit published by the Microsoft Press by the Microsoft Corporation.

Figure 3:
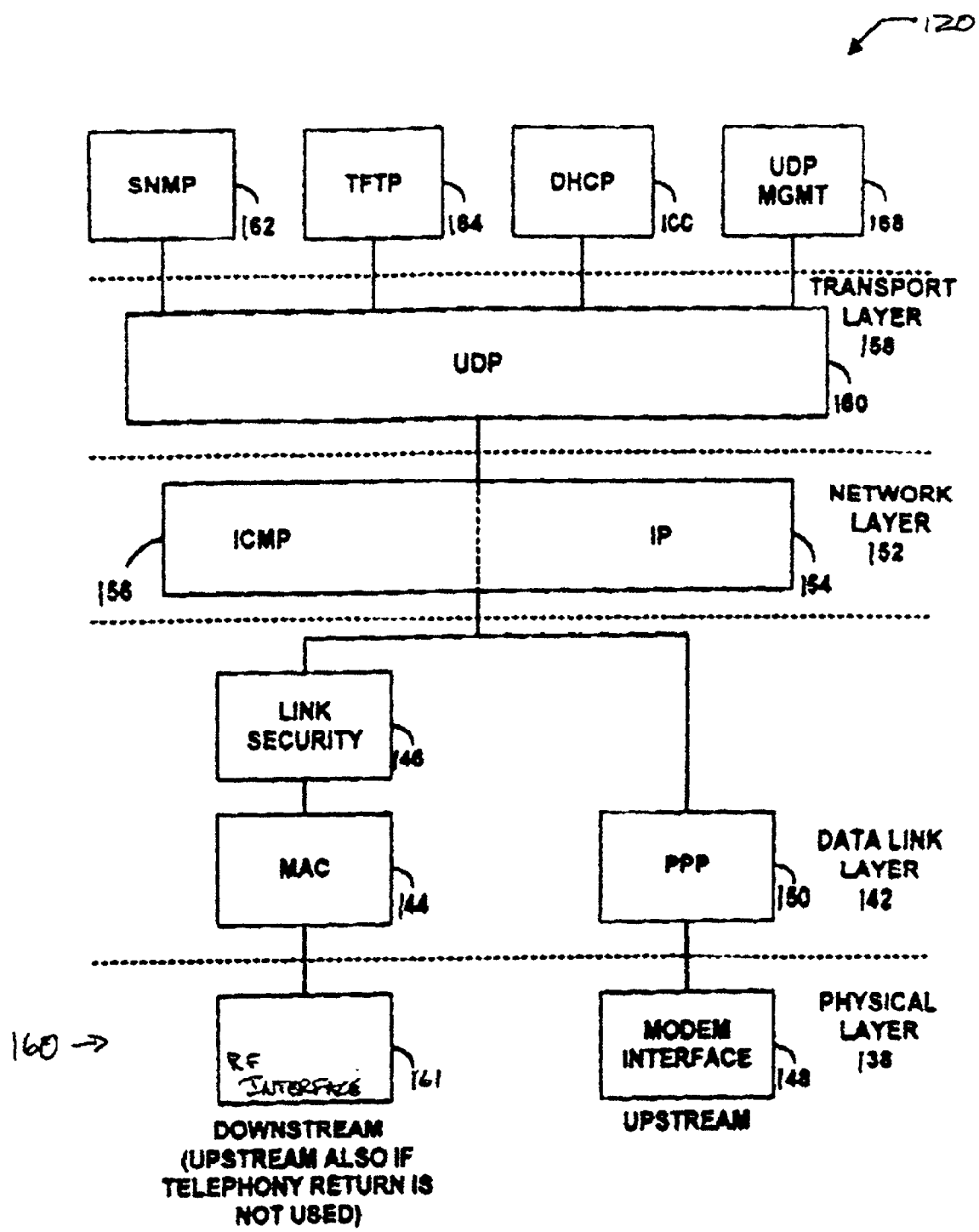
FIG. 3 is a block diagram of a protocol stack that may be used by the network device in FIG. 2.

FIG. 3 shows a block diagram view of the Windows DHCP client 100, the IP stack 120 and the cable modem driver 160. FIG. 3 illustrates the protocols used in cable modem 16. As is known in the art, the Open System Interconnection ("OSI") model is used to describe computer networks. The OSI model consists of seven layers including from lowest-to-highest, a physical, data-link, network, transport, session, application and presentation layer. The physical layer transmits bits over a communication link. The data link layer transmits error free frames of data. The network layer transmits and routes data packets.

The cable modem 16 is connected to cable network 14 in a physical layer 138 via the cable modem driver 160. In a preferred embodiment of the present invention, cable modem driver 160 includes a radio frequency (RF) Interface 161 and modem interface 148. The RF interface 161 is used for downstream communication and the modem interface 148 is used for upstream communication. In bi-directional cable system, however, the cable modem driver 160 includes only the RF interface 161.

The RF interface 161 has an operation frequency range of 50 Mega-Hertz ("MHz") to 1 Giga-Hertz ("GHz") and a channel bandwidth of 6 MHz. However, other operation frequencies may also be used and the invention is not limited to these frequencies.

The RF interface 161 uses a signal modulation method of Quadrature Amplitude Modulation ("QAM"). As is known in the art, QAM is used as a means of encoding digital information over radio, wire, or fiber optic transmission links. QAM is a combination of amplitude and phase modulation and is an extension of multiphase phase-shift-keying. QAM can have any number of discrete digital levels typically including 4, 16, 64 or 256 levels.

In one embodiment of the present invention, QAM-64 is used in the RF interface 161. However, other operating frequencies and modulation methods could also be used. For more information on the RF interface 161, reference is made to the Institute of Electrical and Electronic Engineers ("IEEE") standard 802.14 for cable modems, which is incorporated herein by reference. However, other RF interfaces could also be used and the present invention is not limited to IEEE 802.14 (e.g., RF interfaces from Multimedia Cable Network Systems ("MCNS") and others could also be used).

Above the RF interface 161, in a data-link layer 142, is a Medium Access Control ("MAC") layer 144. As is known in the art, MAC layer 144 controls access to a transmission medium via physical layer 138. For more information on MAC layer protocol 144 see IEEE 802.14 for cable modems. However, other MAC layer protocols 144 could also be used and the present invention is not limited to IEEE 802.14 MAC layer protocols (e.g., MCNS MAC layer protocols and others could also be used).

Above MAC layer 144 is an optional link security protocol stack 146. Link security protocol stack 146 prevents authorized users from making a data connection from cable network 14.

For upstream data transmission with telephony return, the cable modem 16 is connected to the PSTN 22 in physical layer 38 via modem interface 148. The International Telecommunications Union-Telecommunication Standardization Sector ("ITU-T", formerly known as the CCITT) defines standards for communication devices identified by "V.xx" series where "xx" is an identifying number.

In one embodiment of the present invention, ITU-T V.34 is used as modem interface 148. As is known in the art, ITU-T V.34 is commonly used in the data link layer for modem communications and currently allows data rates as high as 33,600 bits-per-second ("bps"). For more information see the ITU-T V.34 standard. However, other modem interfaces or other telephony interfaces could also be used.

Above modem interface 148 in data link layer 142 is Point-to-Point Protocol ("PPP") layer 150, hereinafter PPP 150. As is known in the art, the PPP is used to encapsulate network layer datagrams over a serial communications link. For more information on PPP see Internet Engineering Task Force ("IETF") Request for Comments ("RFC"), RFC-1661, RFC-1662 and RFC-1663 incorporated herein by reference.

Above both the downstream and upstream protocol layers in a network layer 152 is an Internet Protocol ("IP") layer 154. IP layer 154, hereinafter IP 154, roughly corresponds to OSI layer 3, the network layer, but is typically not defined as part of the OSI model. As is known in the art, IP 154 is a routing protocol designed to route traffic within a network or between networks. For more information on IP 154 see RFC-791 incorporated herein by reference.

Internet Control Message Protocol ("ICMP") layer 156 is used for network management. The main functions of ICMP layer 156, hereinafter ICMP 156, include error reporting, reachability testing (e.g., "pinging") congestion control, route-change notification, performance, subnet addressing and others. Since IP 154 is an unacknowledged protocol, packets may be discarded and ICMP 156 is used for error reporting. For more information on ICMP 56 see RFC-971 incorporated herein by reference.

Above IP 154 and ICMP 156 is a transport layer 158 with User Packet Protocol layer 180 ("UDP"). UDP layer 180, hereinafter UDP 180, roughly corresponds to OSI layer 4, the transport layer, but is typically not defined as part of the OSI model. As is known in the art, UDP 180 provides a connectionless mode of communications with packets. For more information on UDP 180 see RFC-768 incorporated herein by reference.

Above the network layer are a Simple Network Management Protocol ("SNMP") layer 162, Trivial File Protocol ("TFTP") layer 164, the Windows DHCP client 100 and a UDP manager 168. The SNMP layer 162 is used to support network management functions. For more information on SNMP layer 162 see RFC-1157 incorporated herein by reference. TFTP layer 164 is a file transfer protocol used to download files and configuration information. For more information on TFTP layer 164 see RFC-1350 incorporated herein by reference. UDP manager 168 distinguishes and routes packets to an appropriate service (e.g., a virtual tunnel). The Windows DHCP client 100 performs requests for configuration parameters from the DHCP server 50. For more information, reference is made to RFC-2131. More or few protocol layers could also be used with data-over-cable system 22.

Referring back to FIG. 2, a device DHCP client such as the cable modem DHCP client 80 is a Windows socket application that creates queries to the DHCP server 50. The cable modem DHCP client 80 communicates the DHCP queries and requests DHCP configuration parameters according to RFC 2131. The queries are passed to the IP stack 120 and cast out over the data network 28 through the cable modem driver 160. The cable modem DHCP client 80 requests configuration parameters that are needed for the cable modem 16 to communicate as part of the network of cable modems connected to the cable modem network 14. Some of these configuration parameters include parameters that are not retrieved and assigned using the Windows DHCP client 100.

For example, the cable modem 16 uses the DHCP to get an address of TFTP server and a TFTP file name. This file is downloaded to the TFTP server and is necessary for the proper operation of the cable modem within the cable modem network 14. Further information regarding the initialization of a cable modem and the process for retrieving cable modem parameters using the DHCP may be found in U.S. patent application Ser. No. 09/018,400 to Beser (filed on Feb. 4, 1998), the contents of which are incorporated by reference herein.

The DHCP server simulator 140 responds to DHCP requests from the Windows DHCP client 100 with the configuration parameters received as a result of requests made by the cable modem DHCP client 80. The DHCP server simulator 140 monitors the requests made by the DHCP client 100. When the DHCP server simulator 140 senses that the Windows DHCP client 100 has issued a DHCPDISCOVER command, the DHCP server simulator 140 injects a response to the DHCPDISCOVER command. In the response, the configuration parameters retrieved by the cable modem DHCP client 80 are provided to the Windows DHCP client 100. The Windows DHCP client 100 assigns the parameters to permit the cable modem 16 to communicate over the data network 28 to other devices such as the DHCP server 30.

It is to be understood by one of ordinary skill in the art that the block diagram in FIG. 2 shows an example of a Windows implementation of a system for assigning configuration parameters. A similar implementation may be used with any other operating system having a proprietary DHCP client that does not permit the assignment of configuration parameters to be manipulated.

Figure 4:
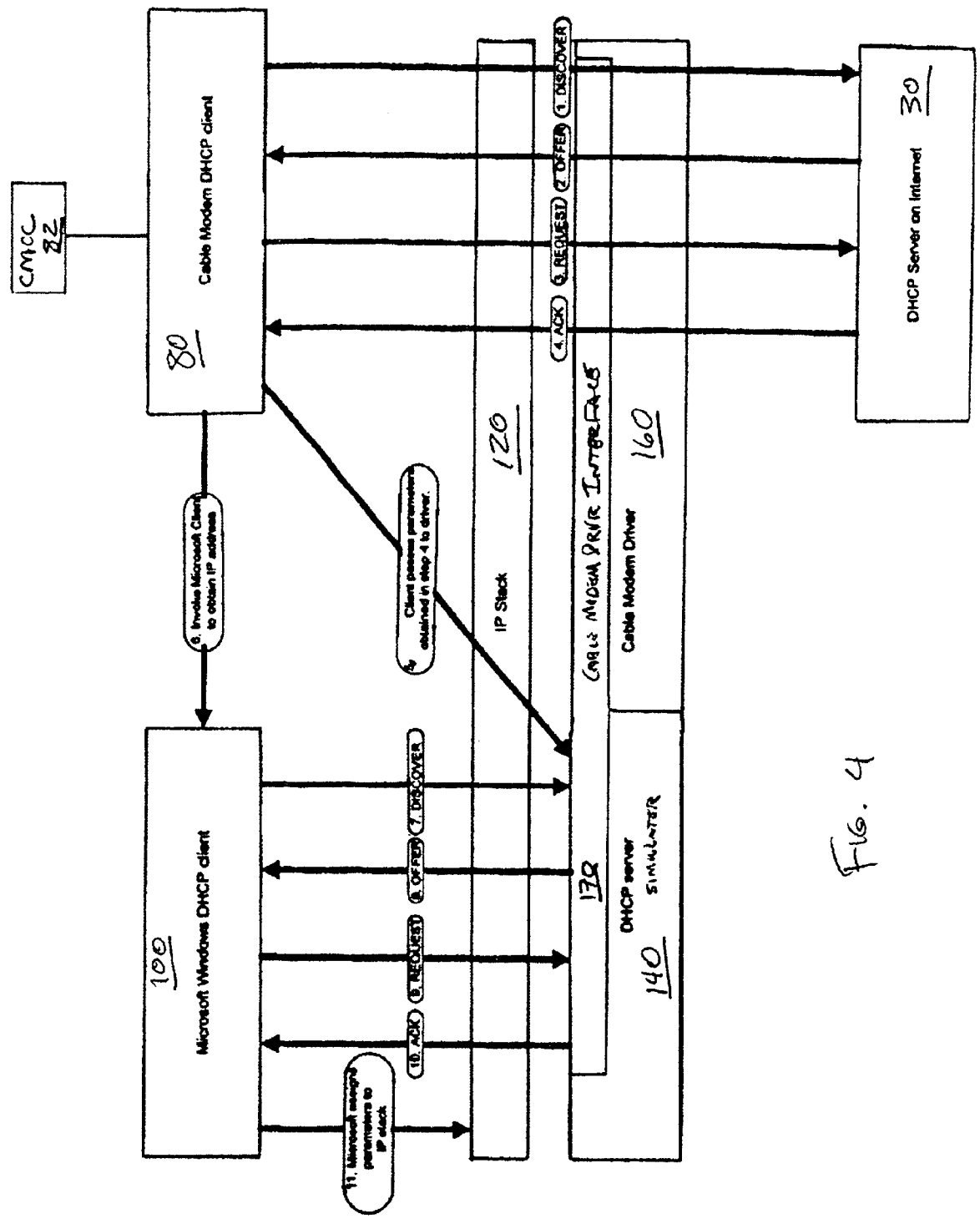
FIG. 4 is a block diagram showing the flow of messages used during the request and receipt of configuration parameters from the DHCP.

FIG. 4 shows the block diagram of the cable modem to CPE interface 20 of FIG. 2 with a method with a flow of messages that may be used to assign configuration parameters for a cable modem system. The method in FIG. 4 uses a DHCP message interchange described in RFC 2131 used for obtaining configuration parameters from a DHCP server.

In a typical network device, the DHCP client initiates the process by sending the DHCPDISCOVER message to determine if a DHCP server is available. Each DHCP server that is available will respond with an DHCPOFFER message, which contains the IP address and all other parameters needed. The client then chooses an DHCPOFFER and sends a DHCPREQUEST message to indicate acceptance of the DHCPOFFER. The server then acknowledges the DHCPREQUEST with an DHCPACKNOWLEDGE message.

Referring to FIG. 4, during the initialization of the CPE 18, the cable modem DHCP client 80 issues a DHCPDIS- COVER message as shown in Step 1. The DHCPDISCOVER message in Step 1 may include a specific DHCP server address and be unicast to that address. Alternatively, the DHCPDISCOVER message may be broadcast to any DHCP server 30 available.

In a preferred embodiment, a Cable Modem Connection Center (CMCC) 82, which is an application program that controls the cable modem resources in the CPE 18, invokes the cable modem DHCP client 80. The Cable Modem Connection Center 82 obtains the parameters returned by the DHCP server 30 using standard Windows function calls.

The cable modem DHCP client 80 is a Winsock application that creates a packet for the DHCPDISCOVER message and passes the packet to the IP stack 120. The IP stack 120 sends the packet to the cable modem driver 160 which communicates the packet to the data network 28.

At Step 2, each DHCP server 30 that receives the DHCPDISCOVER message broadcast, or the DHCP server 30 addressed by the designated server address sends a DHCPOFFER message with all of the parameters that the cable modem 16 needs. The DHCPDISCOVER message includes the list of parameters that the DHCP client needs. The DHCP server sends a DHCPOFFER if it can accommodate the parameters needed by the client.

The cable modem DHCP client 80 receives the DHCPOFFER messages and selects one offer to which to respond. At Step 3, the cable modem DHCP client 80 sends a DHCPREQUEST message to the server identified in the selected DHCPOFFER message. The DHCP server 30 receives the DHCPREQUEST message and, at Step 4, sends a DHCPACKNOWLEDGE message to confirm that the cable modem 16 has a valid IP address and is ready to communicate data. In a preferred embodiment, the parameters that the cable modem DHCP client 80 received are:

IP address default gateway subnet mask domain name domain name server lease time binding time renewal time tftp filename tftp server address.

The cable modem DHCP client 80 in FIG. 4 cannot assign the parameters received because the Windows Network Architecture can only assign configuration parameters received using the Windows DHCP client 100. For example, the IP address retrieved in the DHCPOFFER cannot be used by the cable modem driver 160 because the cable modem DHCP client 80 cannot set the IP address in the IP stack 120.

At Step 5, the cable modem DHCP client 80 passes the parameters it received from the DHCP server 30 to the DHCP server simulator 140. The parameters are passed using standard Windows API's by the Cable Modem Connection Center 82. The TFTP filename and the TFTP server address are used by the Cable Modem Connection Center 82 and are therefore, not passed to the Windows DHCP client 100.

The cable modem DHCP client 80 then invokes the Windows DHCP client 100 at Step 6 with a request for a new IP address. In a preferred embodiment, the Windows DHCP client is implemented in an NDIS driver which exports an API to pass information to the Windows DHCP client 100. The advantage of using the Windows API is that in one function, the Windows DHCP client 100 releases the IP address that it has and also causes it to obtain a new IP address by invoking the DHCP server 30 in a DHCPDISCOVER message.

The Windows DHCP client 100 sends a DHCPDISCOVER message to find a DHCP server at Step 7. The DHCPDISCOVER message is intercepted by the DHCP server simulator 140 before it is sent over the network 28 at Step 7. The DHCP server simulator 140 analyzes every packet that is sent by the Windows DHCP client 100. In a preferred embodiment, the computer program in the attached Appendix is used to monitor the Windows DHCP client 100 messages.

At Step 8, the DHCP server simulator 140 constructs a DHCPOFFER message to send to the Windows DHCP client 100. The Windows DHCP client 100 receives the DHCPOFFER message and accepts the message in spite of the fact that it was not received from the network. At Step 9, the Windows DHCP client 100 then sends a DHCPREQUEST message to the DHCP server 30 designated in the DHCPOFFER as having sent the DHCPOFFER. At Step 10, the DHCP server simulator 140 sends the DHCPACKNOWLEDGE message to the Windows DHCP client 100 with all of the parameters that had been received by the cable modem DHCP client 80 in Step 4.

Once the DHCPACKNOWLEDGE message is received, the Windows DHCP client 100 assigns the parameters to the IP stack 120 at Step 11. The CPE 18 is then ready to communicate using the cable modem 16.

While the invention has been described in conjunction with presently preferred embodiments of the invention, persons of skill in the art will appreciate that variations may be made without departure from the scope and spirit of the invention. For example, the use of the protocols, tools, operating systems and standards referenced above is merely by way of example. Any suitable protocol, tool, operating system or standard may be used in preferred embodiments of the present invention. This true scope and spirit is defined by the appended claims, interpreted in light of the foregoing.

We claim:

1. An improvement in a network connected to a network device and a dynamic host configuration protocol server (DHCP server), the network device having a plurality of configuration parameters, a resident dynamic host configuration protocol client (DHCP client), and a device driver, the resident DHCP client being operable to assign the plurality of configuration parameters to the network device, the improvement comprising:

a DHCP server simulator and a device DHCP client within the network device, the device DHCP client being operable to communicate over the network to query the DHCP server for at least one selected configuration parameter, to pass a message having the at least one selected configuration parameter to the resident DHCP client; and the DHCP server simulator being operable to monitor the resident DHCP client and to intercept and analyze the message having the at least one selected configuration parameter from the device DHCP client;

the DHCP server operable to send to the resident DHCP client a plurality of DHCP messages including the message having the at least one selected configuration parameter in response to a request from the DHCP client.

2. An improvement as claimed in claim 1 wherein the resident DHCP client is a Windows DHCP client.

3. An improvement as claimed in claim 1 wherein the network device further comprises an Internet stack comprising a plurality of communication protocols for communicating over the Internet, the Internet stack operable to use the plurality of configuration parameters assigned by the resident DHCP client.

4. An improvement as claimed in claim 1 wherein the device driver is a cable modem driver having a bi-directional radio frequency interface for communicating bi-directionally over a cable modem network.

5. An improvement as claimed in claim 4 further comprising a cable modem connection application for managing the configuration of the cable modem driver.

6. An improvement as claimed in claim 5 wherein the selected configuration parameters include a trivial file transport protocol server address and a trivial file transport protocol file name.

7. A method for obtaining configuration parameters for a network device in a network connected to a dynamic host configuration server (DHCP server) comprising the steps of:

invoking a device dynamic host configuration protocol client (DHCP client) to discover the DHCP server;

receiving an offer message from the DHCP server;

sending a request message to request a plurality of selected configuration parameters from the DHCP server;

the DHCP server sending the selected configuration parameters to the device DHCP client;

passing the selected configuration parameters to a DHCP server simulator within the network device;

the DHCP server simulator sensing a discover message from a resident DHCP client within the network device;

the DHCP server simulator sending an offer message to the resident DHCP client;

the DHCP server simulator sending the selected configuration parameters; and assigning the selected configuration parameters to permit communication by the device driver over the network.

8. A method for obtaining configuration parameters for a network device in a network connected to a dynamic host configuration server (DHCP server) comprising the steps of:

receiving an offer message from the DHCP server at a device DHCP client on the network device;

the device DHCP client sending a request message to request a plurality of selected configuration parameters from the DHCP server;

the DHCP server sending the selected configuration parameters to the network device;

storing the selected configuration parameters at a DHCP server simulator in the network device; and the DHCP server simulator sending the selected configuration parameters to a resident DHCP client in the network device.

9. The method of claim 8 further comprising the step of assigning the selected configuration parameters to a protocol stack to permit communication by the device driver over the network.

10. The method of claim 8 further comprising the steps of:

the resident DHCP client sending a discover message to detect the DHCP server; and the DHCP server simulator sensing the discover request.

* * * * *